Figure 1:
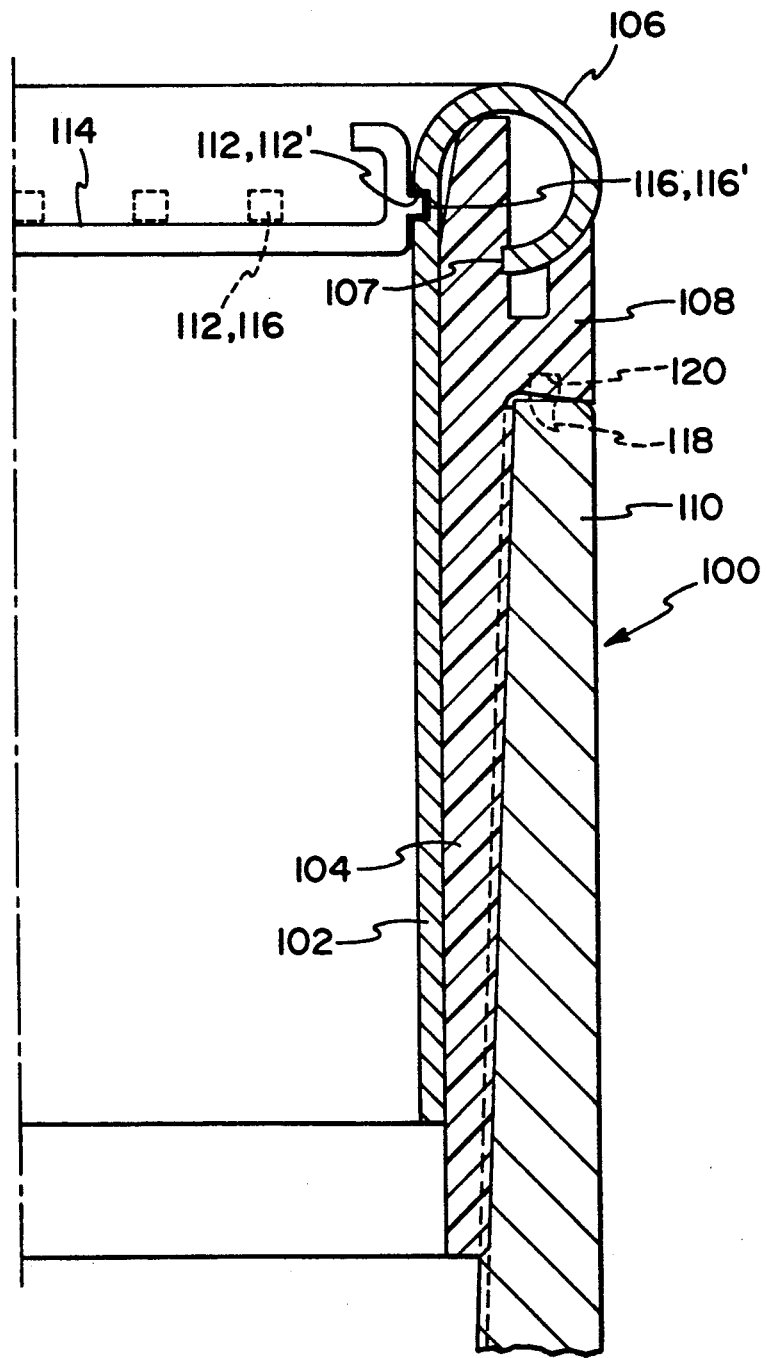

United States Patent [19]

Dreyfuss et al.

[11] Patent Number: 5,195,562
[45] Date of Patent: Mar. 23, 1993

[54] PIPE-END PROTECTOR

[75] Inventors: Wilfried Dreyfuss, Eimke, Fed. Rep. of Germany; Thomas E. Remp, Houston, Tex.; Kurt Müller, Eicklingen, Fed. Rep. of Germany

[73] Assignee: Drilltec Patents & Technologies Co., Houston, Tex.

[21] Appl. No.: 531,107

[22] Filed: May 31, 1990

Related U.S. Application Data

[62] Division of Ser. No. 212,795, Jun. 29, 1988, Pat. No. 4,957,141.

[51] Int. Cl.⁵ .............................................. B65D 59/06
[52] U.S. Cl. ..................................... 138/96 T; 138/89
[58] Field of Search ...................... 138/89, 96 R, 96 T

[56] References Cited

U.S. PATENT DOCUMENTS

| | | | |
|---|---|---|---|
| 1,692,710 | 11/1928 | Spahn | 138/96 T |
| 2,098,087 | 11/1937 | Engstrom | 138/96 T |
| 2,134,730 | 11/1938 | Osborn | 138/96 T |
| 2,215,829 | 9/1940 | Evans | 138/96 R |
| 2,316,013 | 4/1942 | Mulholland | 138/96 T |
| 2,691,992 | 10/1954 | Phillips | 138/96 T |
| 4,139,005 | 2/1979 | Dickey | 138/96 T |
| 4,210,179 | 7/1980 | Galer | 138/96 T |
| 4,337,799 | 7/1982 | Hoover | 138/96 T |
| 4,379,471 | 4/1983 | Kuenzel | 138/96 T |
| 4,487,228 | 12/1984 | Waldo et al. | 138/89 |
| 4,582,090 | 4/1986 | Chose et al. | 138/89 |
| 4,655,256 | 4/1987 | Lasota et al. | 138/96 T |
| 4,662,402 | 5/1987 | Dreyfuss et al. | 138/96 T |

FOREIGN PATENT DOCUMENTS

| | | |
|---|---|---|
| 664372 | 5/1933 | Fed. Rep. of Germany . |
| 872393 | 6/1942 | France .................. 138/96 R |

Primary Examiner—James E. Bryant, III
Attorney, Agent, or Firm—Shlesinger, Arkwright & Garvey

[57] ABSTRACT

A protector for the threads of a pipe-end, comprises a tubular member including a longitudinal portion and a curved end portion bent substantially 270°, the curved end portion including an edge disposed a distance away from the longitudinal portion; and an elastomeric sleeve disposed co-axially and substantially co-extensively relative to the tubular member. The sleeve is adapted to engage the threads of the pipe-end. The sleeve includes an end portion disposed between the edge and the longitudinal portion, the edge clamping the sleeve end portion against the longitudinal portion, thereby securing the sleeve to the tubular member. The sleeve includes a radially extending annular flange disposed outside the curved end portion for engaging an end portion of the pipe-end.

6 Claims, 1 Drawing Sheet

PIPE-END PROTECTOR

This is a continuation division of application Ser. No. 07/212,795, filed Jun. 29, 1988, now U.S. Pat. No. 4,957,141.

The invention concerns a pipe-end protector.

Protectors consisting of a metal housing and an integral plastic inset, or of a metal plug and an integral sleeve-like cover have long been known; illustratively see the German patent 2,939,384 and the German Offenlegungsschrift 2,800,747. These devices incur the drawback that insets and covers must be made using comparatively expensive tools or molds where following injection, either the thread core must be turned out or the inset or cover must be screwed off the core. Molds with so-called drop cores are economical only for mass production because of their complex design.

Furthermore, plastic protectors have long been known.

Protectors with integral insets or covers and also protectors made of plastic moreover suffer from the drawback of being hard to disassemble, and even harder to assemble, at low temperatures on account of the contraction of the plastic. As a result substantial problems may be encountered when using such protectors for instance for petroleum pipes, which are used at much different temperatures, especially where large-diameter pipes are concerned.

Again protectors are known for which the metal housing of the metal plug is merely bent around at the upper edge to provide the protective cap or plug with greater strength. In many cases, especially with large-diameter pipes or with very heavy pipes, the strength no longer suffices to effectively protect the pipe end and the pipe threads against impacts.

Accordingly the object of the present invention is to so design a protector of the initially cited kind that greater strength is possible. Also, manufacture shall be made easier.

This problem is solved by the present invention wherein a pipe-end protector is provided, which depending on the application, is in the form of a cap or a plug with a metal housing and a sleeve-like elastomer inset or with a metal plug and a sleeve-like elastomer cover, respectively, characterized in that the metal housing or the metal plug is tubular and comprised a flanged or rolled edge at the outer end. The manufacture is substantially eased by the designs of the present invention. Advantageous and appropriate further developments are stated in the application.

Protectors of the type disclosed herein are substantially stronger than protectors known heretofore, in particular on account of the flanged, or rolled, or folded edge.

On account of the design disclosed herein, the manufacture of the insert or cover is feasible using simple molds which are much more economical to make than those hitherto used in the state of the art. The molds merely need be equipped with ejector pins to eject the injection molding. As a result cooling and fabrication times are substantially reduced.

The metal housing and the metal stopper of the invention are equally advantageously applicable, whether integral or multi-part insets and covers are concerned.

The groove formed in the inset illustratively may be used to insert a bottom in order to turn an open protective cap into a closed one. Separate sealing elements also may be placed into the grooves, as disclosed herein. Instead of such sealing elements, injection-molded thin-walled strips also may be provided as axial sealing rings.

The further development disclosed herein allows especially good axial fastening of the inset or cover to the metal unit.

The protectors disclosed herein are especially advantageous.

The invention is elucidated below in relation to the attached drawing showing the embodiment mode.

FIG. 1 is an embodiment of a pipe-end protector according to the present invention.

FIG. 1 shows a section of a protective plug 100 with a hollow-cylindrical metal plug 102 having an elastomer sleeve-like cover 104. The hollow-cylindrical plug is provided at its end with an outwardly bent flange edge 106. The cover 104 enters the flange of the flange edge 106 in such a way that the outwardly bent part of this edge overlaps the end of the cover 104 and that the free flange edge 107 engages the cover or rests against it clamping manner. The flange edge 106 is bent substantially 270 degrees, as shown in FIG. 1. On the outside the cover 104 comprises a circumferential stop 108 for the pipe end 110. On the inside, the metal plug comprises one circumferential clearance 112' or several spaced circumferential clearances 112 near the flanged edge 106 into which an elastic, snap in lid 114 with one circumferential rib 116' or with several spaced projections 116, can be removably inserted. A circumferential seal 118 in the form of a sealing lip is integrated in the annular pipe stop surface of the stop 108 to cover the gap between the stop and the pipe end, and this seal 118 when unloaded will point obliquely outward (shown in dashed lines). However a groove 120 also may be provided there (shown in dashed lines) for an insertable seal.

Because of the special design of the flanged edge together with the inset or cover of FIG. 1, additional elements to secure against rotation and against dropping-out, (axially loose inset or cover), will not be needed. This securing against dropping-out or rotation is assured by the flanged edges engaging the elastomer of the inset or of the cover or by its clamping action.

We claim:

1. A protector for the threads of a pipe-end, comprising:
   a) a tubular member including a longitudinal portion and a curved end portion bent outwardly substantially 270°, said curved end portion including an edge disposed a distance away from said longitudinal portion;
   b) an elastomeric sleeve disposed co-axially and substantially co-extensively outside of said tubular member, said sleeve being adapted to engage the threads of a pipe-end;
   c) said sleeve including an end portion disposed between said edge and said longitudinal portion, said edge clamping said sleeve end portion against said longitudinal portion, thereby securing said sleeve to said tubular member;
   d) said sleeve including a radially extending annular flange disposed outside said curved end portion for engaging an end portion of the pipe-end; and
   e) an elastic lid removably secured to said tubular member adjacent said curved end portion.

2. A protector as in claim 1, wherein:
   a) said tubular member includes a circumferential clearance disposed on an inner surface thereof; and b) said elastic lid includes a rib cooperating with said circumferential clearance.
3. A protector as in claim 1, wherein:
a) said tubular member includes a plurality of spaced clearances disposed on an inner surface thereof; and
b) said elastic lid includes a plurality of circumferentially spaced projections cooperating with said spaced clearances.

4. A protector as in claim 1, wherein:
a) said flange includes an annular seal in sealing contact with an end portion of the pipe-end.
5. A protector as in claim 4, wherein:
a) said flange includes an annular groove disposed on a lower surfaces thereof; and
b) said seal is operably associated with said groove.
6. A protector as in claim 5, wherein:
a) said seal is disposed obliquely outwardly.

* * * * *